(12) United States Patent
Yang et al.

(10) Patent No.: US 11,239,738 B2
(45) Date of Patent: Feb. 1, 2022

(54) VARIABLE-SPEED MAGNETIC COUPLING HAVING RADIALLY MOVABLE MAGNET

(71) Applicant: JIANGSU UNIVERSITY, Jiangsu (CN)

(72) Inventors: Chaojun Yang, Jiangsu (CN); Kang Liu, Jiangsu (CN); Weifeng Zhang, Jiangsu (CN); Yingzhi Wu, Jiangsu (CN); Ming Liu, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 547 days.

(21) Appl. No.: 16/313,304

(22) PCT Filed: Mar. 29, 2017

(86) PCT No.: PCT/CN2017/078517
§ 371 (c)(1),
(2) Date: Dec. 26, 2018

(87) PCT Pub. No.: WO2018/000869
PCT Pub. Date: Jan. 4, 2018

(65) Prior Publication Data
US 2019/0157963 A1    May 23, 2019

(30) Foreign Application Priority Data

Jun. 28, 2016  (CN) .......................... 201610490520.4

(51) Int. Cl.
*H02K 49/10* (2006.01)
*H01F 7/02* (2006.01)
(Continued)

(52) U.S. Cl.
CPC ......... *H02K 49/102* (2013.01); *H01F 7/0205* (2013.01); *H01F 7/0242* (2013.01);
(Continued)

(58) Field of Classification Search
CPC .... H02K 49/10; H02K 49/102; H02K 49/104; H02K 49/106; H02K 49/108;
(Continued)

(56) References Cited

U.S. PATENT DOCUMENTS 3,267,310 A * 8/1966 Ireland ................. H02K 49/065
310/103
5,880,548 A * 3/1999 Lamb ................... H02K 49/046
310/103
(Continued)

FOREIGN PATENT DOCUMENTS

CN    102624197 A    8/2012
CN    102664512 A    9/2012
(Continued)

*Primary Examiner* — Tulsidas C Patel
*Assistant Examiner* — Robert E Mates
(74) *Attorney, Agent, or Firm* — Saliwanchik, Lloyd & Eisenschenk

(57) ABSTRACT

A variable-speed magnetic coupling having a radially movable magnet, comprising a drive disc assembly (I), a driven disc assembly (II), and a speed adjusting device assembly (III). Relative rotation of a speed adjustment sleeve (15) with respect to a drive shaft (16) is achieved by means of contact and fitting of a cylindrical pin (20) with respect to a vertical recess on an inner wall of the drive shaft and to an inclined recess on an inner wall of the speed adjustment sleeve. The speed adjustment sleeve is connected to a circular slotted disc (18) by means of a screw. A permanent magnet (10) is attached to a permanent magnet bearer (9) and inserted into a rectangular through hole of a circular frame (13), and a radial movement of the permanent magnet is enabled by means of a cam and groove sliding block mechanism consisting of the circular slotted disc, the circular frame, the permanent magnet bearer, and the permanent magnet. By moving a movement block (21) to drive the movement pin (20) to slide in the recesses of the drive shaft (Continued)

and the speed adjustment sleeve and then drive the speed adjustment sleeve to rotate, the present invention enables a radial movement of the permanent magnet, and then changes a coupling area or an air gap distance between the permanent magnet and conductive rings (8, 11) on two sides, thus changing a magnetic flux density of the air gap, and accordingly enabling speed adjustment.

10 Claims, 12 Drawing Sheets

(51) Int. Cl.
*H02K 51/00* (2006.01)
*H02K 21/02* (2006.01)

(52) U.S. Cl.
CPC ............. *H02K 49/10* (2013.01); *H02K 51/00* (2013.01); *H02K 21/023* (2013.01); *H02K 2213/09* (2013.01)

(58) Field of Classification Search
CPC .. H02K 16/005; H02K 21/021; H02K 21/022; H02K 2213/09; H02K 51/00; H02K 21/023; H01F 7/0242; H01F 7/0205
USPC .................................................. 310/103, 104
See application file for complete search history.

(56) References Cited

U.S. PATENT DOCUMENTS

| | | | | |
|---|---|---|---|---|
| 6,072,258 | A * | 6/2000 | Lamb | .................. H02K 49/046 |
| | | | | 310/191 |
| 2014/0111047 | A1* | 4/2014 | Hashish | .................. H02K 7/09 |
| | | | | 310/90.5 |

FOREIGN PATENT DOCUMENTS

| | | |
|---|---|---|
| CN | 105958791 A | 9/2016 |
| JP | H07308060 A | 11/1995 |

* cited by examiner

US 11,239,738 B2

VARIABLE-SPEED MAGNETIC COUPLING HAVING RADIALLY MOVABLE MAGNET

CROSS REFERENCE TO RELATED APPLICATIONS

This application is a National Stage Application of International Application Number PCT/CN2017/078517, filed Mar. 29, 2017; which claims priority to Chinese Application No. 201610490520.4, filed Jun. 28, 2016.

FIELD OF THE INVENTION

The invention relates to the field of transmission technology in mechanical engineering, and relates to a non-contact type magnetic induction coupling, in particular to a magnet radial movable adjustable speed magnetic coupling. It can be used between a large vibration motor and a load as a transmission system for power transmission and speed regulation.

BACKGROUND OF THE INVENTION

In the field of mechanical engineering, the coupling is an important part of the mechanical transmission system. It is called one of the three major components in the mechanical transmission. It is widely used in various fields of the machinery industry and is widely used in mining, metallurgy, aviation, weaponry, hydropower, chemical industry, textile and transportation sectors. Because the magnetic coupling is a non-contact connection, it can effectively solve the mechanical coupling's resilience and torque problems due to the axial deviation during installation, as well as radial and angular offset vibration problems. Thus, in some fields of high torque vibration, mechanical coupling has been gradually replaced by magnetic coupling to transmit torque and power. However, ordinary magnetic coupling does not solve the problem of motor heating and even failure when the load is started. How to realize low-load starting and full-load operation of the motor, i.e. soft-start, is an important research topic of the motor dragging technology at present.

At the same time, the energy-saving emission reduction has become the focus of the whole society now. At present, China's total installed capacity of motor has reached 400 million kW, the annual power consumption has reached 1.2 trillion kWh, accounting for 60 percent of the total electricity consumption, accounting for 80 percent of industrial electricity consumption, of which installed capacity of wind turbines, water pumps, compressors has exceeded 200 million kW, the annual power consumption has reached 800 billion kWh, accounting for about 40% of the total electricity consumption, so the energy requirements of the motor is quite great, but also the most effective way to save energy. At present, frequency speed regulation is more efficient. However, the frequency converter has strict requirements on the environment. The environment used requires dust, temperature and humidity to meet the operating conditions of the frequency converter. The ambient temperature should be within the range of 0-40° C., it is better to control at about 25° C., the humidity does not exceed 95%, and no condensation or water mist, where the distribution room as far as possible without damp mop, so that the interior of the distribution room can maintain long-term dry state, while the frequency conversion equipment is easy to produce harmonics, the harmonic pollution of high power frequency converter to the power grid is very large, so efficient, reliable, widely used speed regulation device is still an important research topic today.

Jiangsu University in the patent No. 200910263064.X discloses an adjustable speed magnetic induction coupling, by turning the operating handle, the rotation of the handle is transformed into the axial movement of the sleeve, the driving disc base is moved along with the sleeve axially. The symmetrical movement is maintained between driving disc base by rotating the link, so as to regulate the air gap between the permanent magnet on the driving disc base and the conductor ring on the driven disc base to complete speed regulation, while the present invention uses a disc mechanism, the speed regulation is completed by regulating the coupling area between the permanent magnet and the conductor ring, moreover, different from using two rows of permanent magnets as in the above patent, the mechanism uses the conductor ring on both sides of one row of permanent magnet, makes full use of the magnetic field on both sides of the permanent magnets, increases the utilization of permanent magnets, and at the same time, speed regulation is relatively easy and reliable by regulating the coupling area between the permanent magnet and the conductor ring in the disc mechanism due to the great attraction between the permanent magnet and the driven disc.

Patent No. 201010228656.0 discloses a remote controllable adjustable speed disc magnetic coupling. The axial movement of the driving disc base is controlled by installing a micro-motor on the driving shaft, controlling the rotation of the double-headed screw by using the worm screw mechanism, so as to regulate the air gap between the permanent magnet on the driving disc base and the conductor ring on the driven disc base to complete the speed regulation. In the present invention, an intelligent speed regulation is also adopted. Unlike the above patent, the invention uses a rotational speed sensor, a temperature sensor and a limit sensor, which can automatically and intelligently change the rotational speed according to the actual situation during the operation of the coupling, thereby realizing more intelligent control.

Patent No. 201210103051.8 discloses a speed adjustable asynchronous magnetic coupling with adjustable radial air gap. By rotating any one of four small bevel gears with a wrench, the large bevel gear rotates synchronously with the screw plane, so as to drive the movable card body to driving the radial movement of the permanent magnet and change the air gap spacing between the permanent magnet and the conductor to realize the speed regulation. However, the invention cannot adjust the speed according to the work needs while the magnetic coupling operates, and is limited to be only applied in the cylinder mechanism. However, in the present invention, the purpose of speed regulation can be accomplished according to the real-time changes of the load, and the speed regulation mechanism can be widely applied to the mechanism of the disc, the barrel and the driven disc being tapered. In addition, you can add more sensors and microprocessors to achieve more intelligent real-time control.

CONTENT OF THE INVENTION

The present disclosure provides a variable-speed magnetic coupling having radially movable magnet that consists of a driving disc assembly, a driven disc assembly and a speed regulating device assembly. The driven disc assembly includes a driven shaft, a driven shaft sleeve, a driven disc base, a heat sink, a conductor ring and a stud. The right end of the driven shaft is connected with the driven shaft sleeve through a key, the right side of the driven disc sleeve is connected with a driven disc base by screws. The conductor ring is bonded within the driven disc base by means of deep groove embedding. The driven disc bases are fixedly connected to each other by studs, and the heat sink is mounted on the outer side of the driven disc base.

The driving disc assembly includes a driving shaft, a driving shaft sleeve, a baffle, a round frame, a permanent magnet carrier and a permanent magnet. The left end of the driving shaft is connected with the driving shaft sleeve through a key. The right side of the driving shaft sleeve is connected with the round frame by screws. The permanent magnet carrier bonded with the permanent magnet in the upper carrier frame is inserted into the rectangular through hole of the round frame and is rotated synchronously with the driving shaft. It should be noted that the lower end of the permanent magnet carrier is a cuboid with the same cross section everywhere. The cuboid has the same cross-sectional area as the rectangular through-hole on the round frame. In addition, the permanent magnet bonded to the permanent magnet carrier may be an integral permanent magnet, or two step-shaped permanent magnets respectively bonded together from both sides of the carrier frame of the permanent magnet carrier to increase pole arc coefficient of the magnet arrangement.

The speed regulating device assembly includes a cylinder pin, a grooved disc, a speed regulating sleeve, a block, a block pin and a positioning sleeve. The grooved disc is sleeved on the left side of the driving shaft and an arc groove is formed on the left side of the grooved disc. One end of the cylindrical pin is inserted into the through hole of the lower end of the permanent magnet carrier, and the other end of the cylindrical pin is contacted and fitted with the inner wall of the arc groove of the grooved disc, which together with the round frame constitute a groove cam slider mechanism. On the right side of the grooved disc, a speed-regulating sleeve is connected by screws. The speed regulating sleeve is sleeved on the driving shaft. The speed regulating sleeve and the driving shaft are respectively machined with the same number of chutes and straight grooves. The block is sleeved in the speed regulating sleeve, insert the block pin with the same number as chutes in the circular through-hole. Each of the block pin is simultaneously contacted and fitted with the inner walls of one chute and one straight groove on the speed regulating sleeve and the driving shaft. The block can be axially slid along with the block pin on the speed regulating sleeve, and the right end of the positioning sleeve is abutted against the grooved disc to keep its axial fixing.

It should be noted that the rotation angle of the chute on the speed regulating sleeve needs to be equal to the circumferential angle of the arc groove on the grooved disc. Under the condition that the coupler operating environment allows, the axial length of the speed regulating sleeve can be appropriately increased to increase the axial travel of the block in order to increase the speed accuracy. In addition, it is possible to install an intelligent control device on the block and install a sensor at a corresponding position on the coupler, set a rated operating rotational speed and an upper temperature limit of the coupler to operate the coupler under these conditions, so that the coupler can be controlled intelligently.

Working Principle: By toggling the block, the block is axially slipped, and the block pin is inserted in the block. The block pin is slid to the left and right in the straight groove of driving shaft. At the same time, the block pin is contacted and fitted with the inner wall of the chute on the speed regulating sleeve, so that the speed regulating sleeve along with the grooved disc generates a relative rotation relative to the driving shaft. The driving shaft is also fixedly connected with the round frame through the driving shaft sleeve, so the grooved disc relative to the round frame also generates a relative rotation. The inner wall of the arc groove machined on the left side surface of the grooved disc is contacted and fitted with the cylindrical pin, and the cylindrical pin is connected with the permanent magnet carrier. In this way, the round frame, the permanent magnet carrier, together with the permanent magnet and the grooved disc constitute a groove cam slider mechanism. By the rotation of the grooved disc relative to the round frame, and the connection of the arc groove surface of the grooved disc with the permanent magnet carrier through being contacted and fitted with the cylindrical pin, the permanent magnet carrier is slid radially in the rectangular through hole of the round frame. Finally, the radial movement of the permanent magnet is controlled by the axial slip of the block, so as to change the coupling area or air gap spacing between the permanent magnet and the conductor ring to change the air gap magnetic density in the air gap to achieve the purpose of speed regulation.

ADVANTAGES OF THE INVENTION

In the present disclosure, the driving disc is not in contact with the driven disc. The transmission of torques between two discs are achieved through the air gap magnetic field interaction, so as to avoid problems of generating restoring force and torque as well as vibration, etc. When the mechanical coupling is drove, and reduce transmission component losses. The disconnection of the load and the motor is achieved. By regulating the coupling area or air gap spacing between the permanent magnet and the conductor ring to change the air-gap magnetic density, not only the soft-start of the motor can be realized to effectively solve the problem of heating or even failure of the motor load start, but also efficient transmission can be achieved under different loads by regulating the position of the block.

When the present speed regulating mechanism is applied to a disc mechanism, a structure of one row of permanent magnet between the both sides of the conductor ring is used. It effectively uses the magnetic field on both sides of the permanent magnet and greatly enhances the utilization of permanent magnet. Unlike the previous patents, it adjusts the speed by regulating the coupling area between the permanent magnet and the conductor ring when the present speed regulating mechanism is applied to a disc mechanism, and the speed regulating mechanism can be widely used in magnetic couplers with the structures of disc, multi-disc, cylinder and wedge type. In addition, the driven disc adopts deep groove embedded conductor ring structure. The ability of torque transmission of the magnetic coupler has been greatly improved by the use of deep groove skin effect.

When a magnetic coupler is applied to a disc structure, the magnetic field generated by electromagnetic induction in the conductor ring and the interaction between the material of the driven disc (such as the yoke) and the permanent magnet cause a great attraction between the driving disc and the driven disc. It is especially difficult to adjust the axial spacing (that is, air gap spacing) between them. However, in the present invention, it is relatively easy to change their coupling area by radial displacement so that the mechanism is more reliable and practical.

BRIEF DESCRIPTION OF DRAWINGS

The invention will be further described below with reference to the accompanying drawings and examples.

EMBODIMENTS

Example 1

Figure 1:
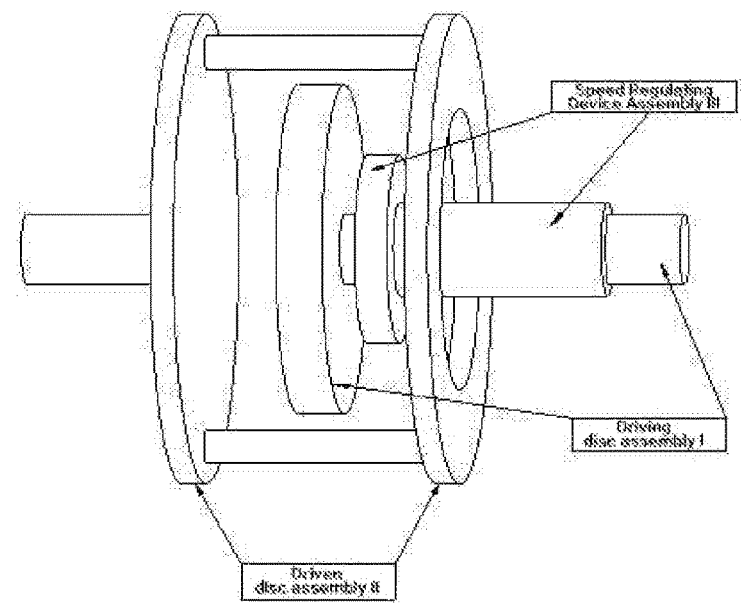
FIG. 1 is a schematic view of a disc type magnet radial movable adjustable speed magnetic coupler device assembly of Example 1.
Figure 2:
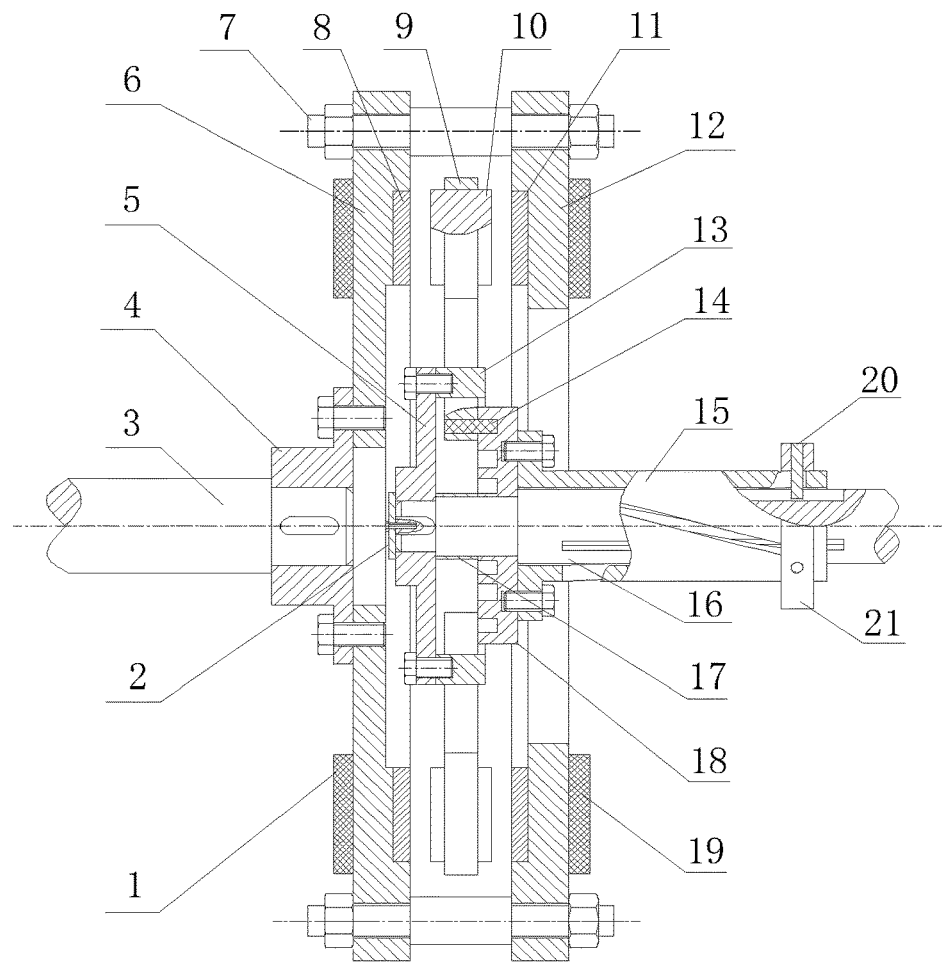
FIG. 2 is a schematic cross-sectional view showing the working principle and structure of Example 1.
Figure 4:
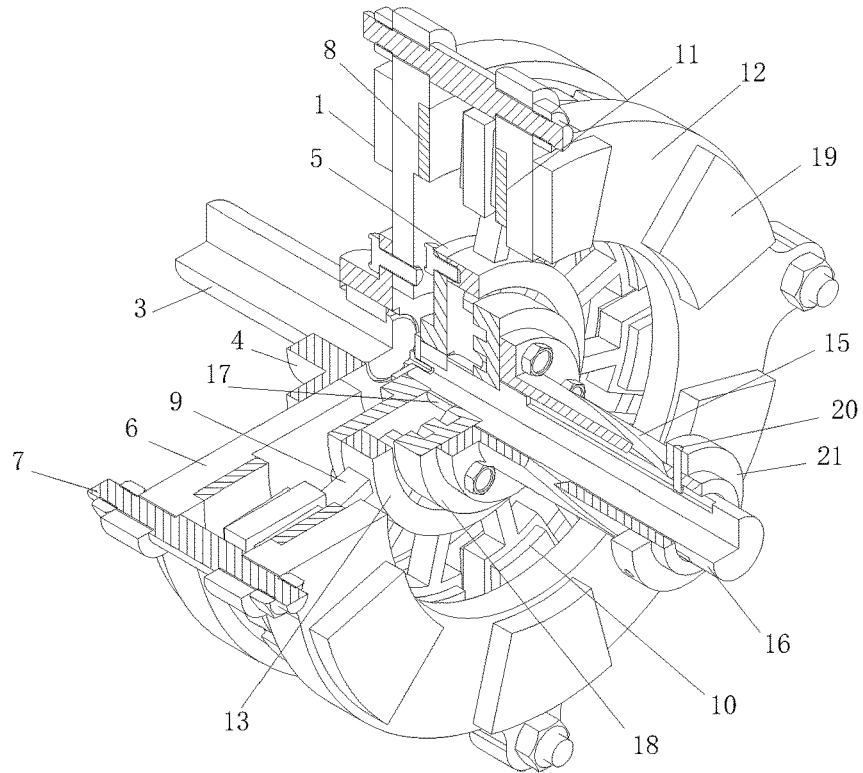
FIG. 4 is a ¼ cross-sectional view of the overall three-dimensional structure of Example 1.
Figure 5:
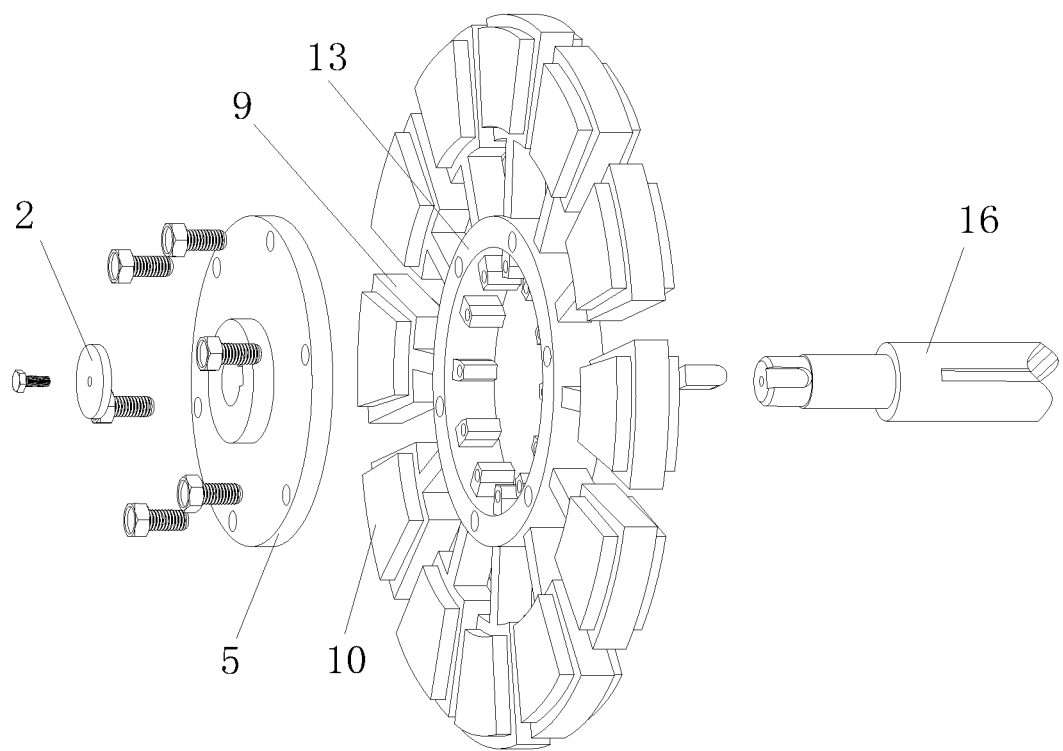
FIG. 5 is a three-dimensional exploded view of the driving disc assembly of Example 1.

As shown in FIG. 1, it is composed of a driving disc assembly I, a driven disc assembly II and a speed regulating device assembly III. As shown in FIGS. 2, 4 and 5, the driving disc assembly includes a driving shaft 16, a driving shaft sleeve 5, a baffle 2, a round frame 13, a permanent magnet carrier 9, and a permanent magnet 10. A driving shaft sleeve 5 is connected to the left end of the driving shaft 16 by a key, and a baffle 2 is connected to the left end surface of the driving shaft 16 by screws to maintain the axial fixing of the driving shaft sleeve 5. A round frame 13 is connected to the right side of the driving shaft sleeve 5 by screws, and a rectangular through hole is formed in the round frame 13.

Figure 6:
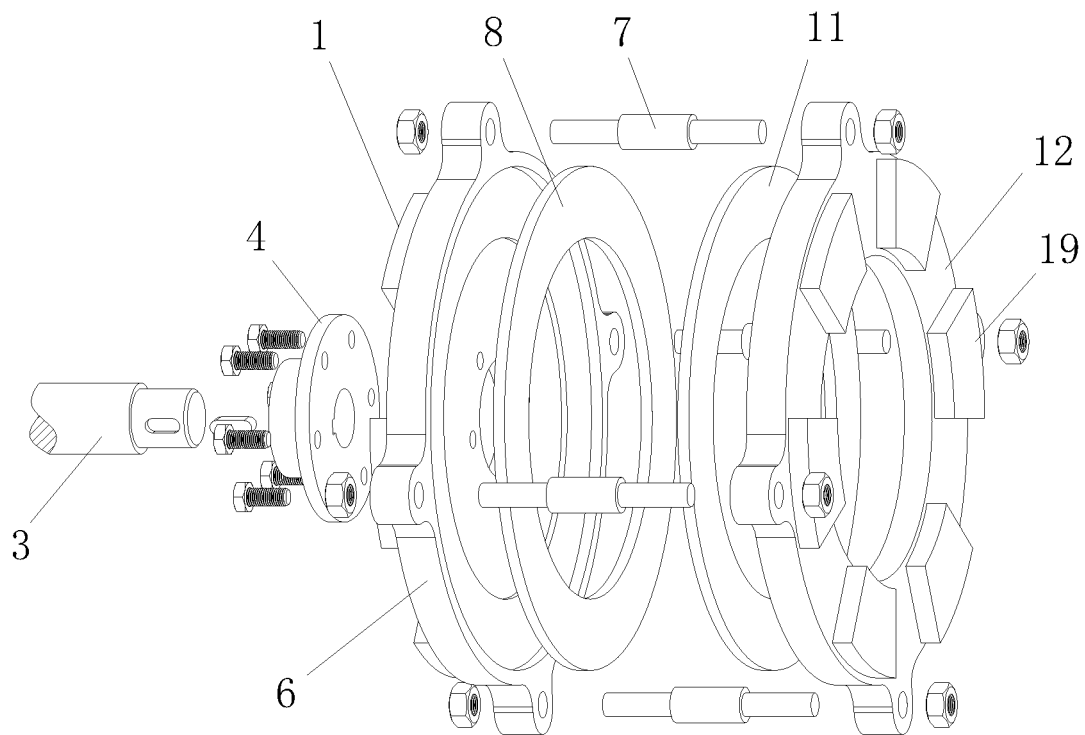
FIG. 6 is a three-dimensional exploded view of the driven disc assembly of Example 1.
Figure 7:
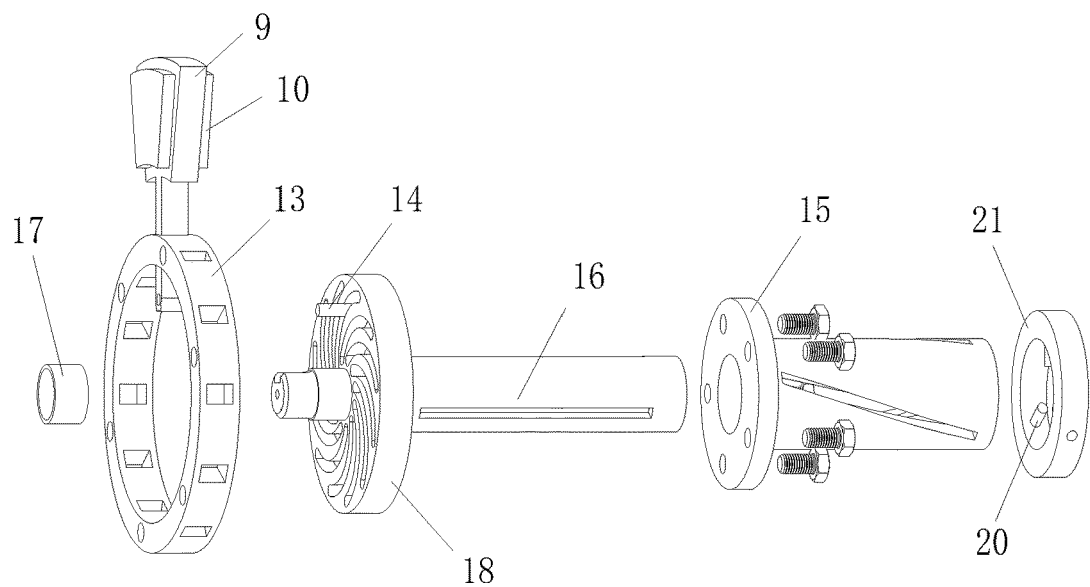
FIG. 7 is a three-dimensional exploded view of the speed regulating device assembly of Example 1.
Figure 8:
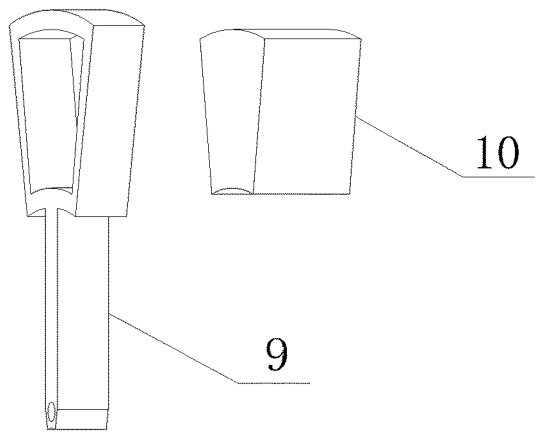
FIG. 8 is a schematic view showing the three-dimensional structure of the permanent magnet of Example 1.
Figure 10:
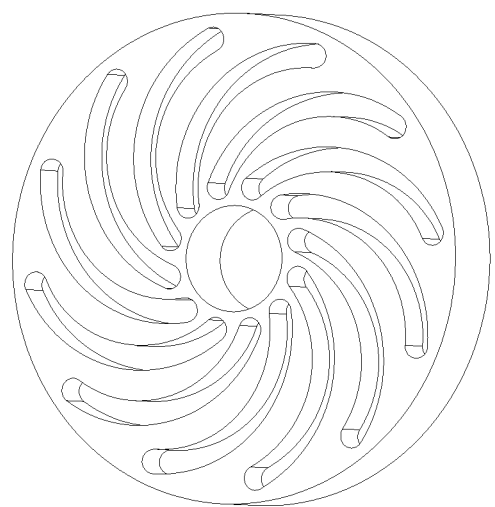
FIG. 10 is a schematic view showing the three-dimensional structure of the grooved disc of Example 1.

A permanent magnet carrier 9 is inserted into the rectangular through hole of the round frame 13, and a permanent magnet 10 is bonded to the carrier frame of the permanent magnet carrier 9. As shown in FIG. 8, the permanent magnet 10 alternately arranged in N pole and S pole is bonded to the carrier frame of the permanent magnet carrier 9. As shown in FIG. 2, FIG. 4 and FIG. 6, the driven shaft assembly includes a driven shaft 3, a driven shaft sleeve 4, a driven disc left base 6, a driven disc right base 12, a stud 7, a conductor ring 8, conductor ring 11, heat sink 1 and heat sink 19. A driven shaft sleeve 4 is connected to the right side of the driven shaft 3 by a key. A driven disc left base 6 is connected to the right side of the driven shaft sleeve 4 by a screw. The driven disc left base 6 and the driven disc right base 12 are fixedly connected by a stud 7. It should be noted that the driven disc base bonded one side of conductor ring is not surrounded by the yoke at the inner diameter of the conductor ring. Heat sink 1 and heat sink 19 are respectively mounted on the outer end faces of the driven disc left base 6 and the driven disc right base 12 to increase the heat dissipation capability of the coupler. As shown in FIG. 2, FIG. 4 and FIG. 7, the speed regulating device assembly includes a block 21, a block pin 20, a speed regulating sleeve 15, a grooved disc 18, a cylindrical pin 14 and a positioning sleeve 17, The speed regulating sleeve 15 is machined with a chute, the driving shaft 16 is formed with a straight groove, and the speed regulating sleeve 15 is sleeved on the driving shaft 16. The block 21 can slide left and right on the speed regulating sleeve 15. A through hole is provided in the block 21, and a block pin 20 is mounted on the through hole. The block pin 20 maintains contact and fitting with the chute on the speed regulating sleeve 15 and the straight groove on the driving shaft 16. A grooved disc 18 is connected to the left side of the speed regulating sleeve 15 by screws, and an arc groove with the same number as the permanent magnet is machined on the left end surface of the grooved disc 18, as shown in FIG. 10. A through hole is provided at a lower end of the permanent magnet carrier 10. The cylindrical pin 14 is passed through the through hole of the permanent magnet carrier 10 and maintains contact and fitting with the inner wall of the arc groove of the grooved disc 18. The positioning sleeve 17 is sleeved over the driving shaft 16 with its right side abutted against the grooved disc 18 to maintain the grooved disc axial fixing.

Figure 9:
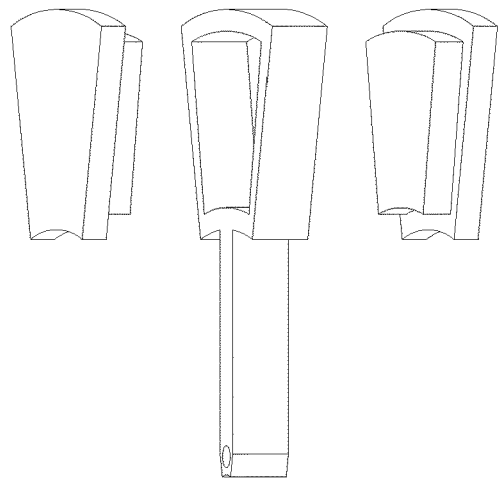
FIG. 9 is a schematic view showing the three-dimensional structure of the stepped permanent magnet of Example 1.

Working principle: When the block 21 does not move axially, the driving shaft 16 drives the driving shaft sleeve 5 to rotate by the key. The driving shaft sleeve 5 is connected to the round frame 13 by screws, and the permanent magnet 10 is bonded to the carrier frame of the permanent magnet carrier 9 as a whole into the rectangular through hole of the round frame 13. Therefore, the above-mentioned components are integrally rotated, and at this time, the permanent magnet 10 is relatively moved with respect to the conductor ring 8 and the conductor ring 11 on the driven disc left base 6 and the driven disc right base 12. By electromagnetic induction, an induced current is generated in the conductor ring 8 and the conductor ring 11, and the induced magnetic field generated by the induced current on the conductor ring 8 and the conductor ring 11 respectively interacts with the magnetic fields on the left and right sides of the permanent magnet 10 to generate electromagnetic torque, so as to drive the driven disc left base 6 and the driven disc right base 12 to rotate. It should be noted that, as shown in FIG. 9, in order to facilitate the installation, the permanent magnets 10 may be processed into stepped permanent magnets respectively bonded to the left and right sides of the carrier frame on the permanent magnet carrier 9. At the same time, the pole arc coefficient of the magnet arrangement can be increased.

Figure 3:
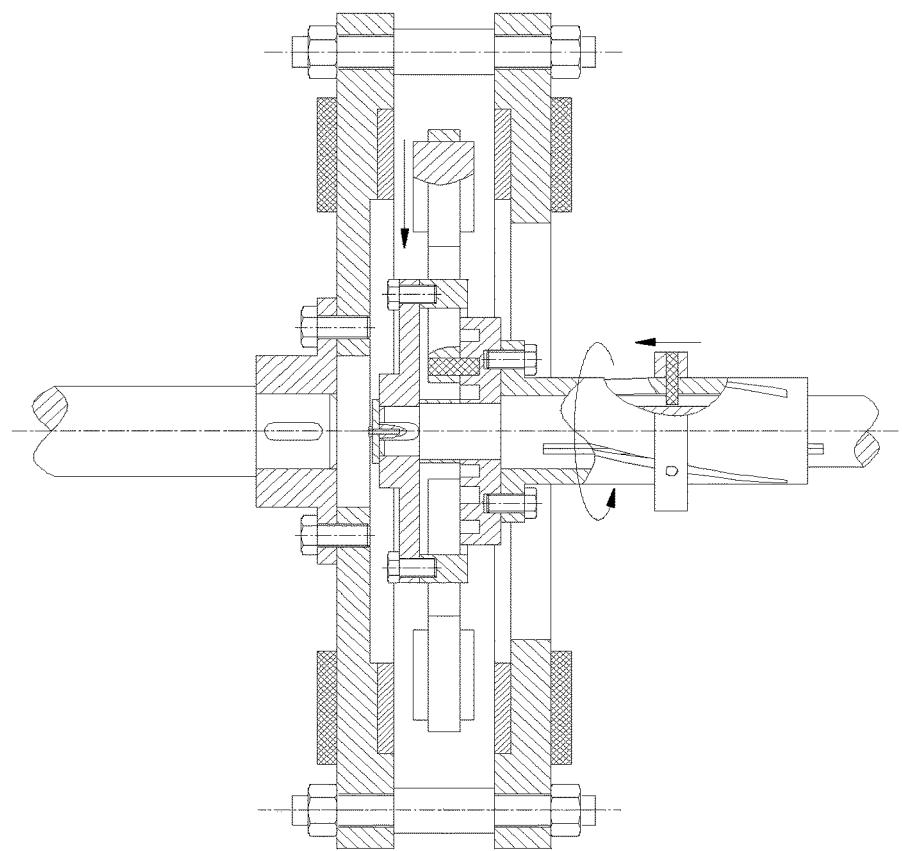
FIG. 3 is a schematic cross-sectional view showing the working principle and structure of Example 1 during the speed regulation.

Speed regulation principle: The electromagnetic torque between the main driven shaft of the magnetic coupler is related to the magnitude of the air gap magnetic density. In the present example, the air gap is kept constant, and the coupling area between the permanent magnet and the conductor ring is changed, thereby changing the magnitude of the air gap magnetic density. Since the eddy current is also generated in the material of the driven disc, it is noted that the driven disc base bonded on one side of conductor ring is not surrounded by the yoke at the position of the inner diameter of the conductor ring. The electromagnetic torque is maximized when the coupling area between the permanent magnet and the conductor ring is the largest. When the right position of the permanent magnet and the conductor ring is changed, the coupling area is decreased gradually, and the electromagnetic torque between the main driven discs is also decreased gradually. In this example, it is possible to cause axial displacement by toggling the block 21. The cylindrical pin 20 is inserted into the block 21, and the cylindrical pin 20 is axially slid in the straight groove of the driving shaft 16. Since the cylindrical pin 20 is contacted and fitted with the inner wall of the chute on the speed regulating sleeve 15, the speed regulating sleeve 15 and the grooved disc 18 are relatively rotated with respect to the driving shaft 16. As shown in FIGS. 2 and 3, when the grooved disc 18 is relatively rotated with respect to the driving shaft 16, since the driving shaft 16 and the round frame 13 are fixedly connected by the driving shaft sleeve 5, the grooved disc 18 is relatively rotated with respect to the round frame 13. The inner wall of the arc groove formed on the grooved disc 18 is contacted and fitted with the cylindrical pin 14, and the cylindrical pin 14 is connected to the permanent magnet carrier 10. Therefore, the round frame 13, the permanent magnet carrier 9 together with the permanent magnet 10 and the grooved disc 18 constitute a grooved cam slider mechanism. The relative rotation of the grooved disc 18 is used to achieve radial movement of the permanent magnet carrier, so as to change the coupling area between the permanent magnet and the conductor ring. As shown in FIG. 3, the air gap magnetic density in the air gap is changed to achieve the purpose of speed regulation.

In particular, by design, the angle of rotation of the chute on the speed regulating sleeve 15 is maintained to coincide with the circumferential angle of the arc groove on the grooved disc 18. The position of the chute on the speed regulating sleeve 15 is designed so that the coupling area between the permanent magnet and the conductor ring is minimized when the block 21 is at the leftmost end of the chute of the speed regulating sleeve 15, and the coupling area between the permanent magnet and the conductor ring is the largest when the block 21 is at the rightmost end of the chute of the speed regulating sleeve 15, and the electromagnetic torque is transmitted to the maximum, that is, the machine is running at full load, and the speed adjustment process is shown in FIG. 3. At the same time, since the block 21 is moved on the chute of the speed regulating sleeve 15, the transmission torque is synchronously changed, the stepless speed change can be realized. Moreover, the axial travel of the block can be changed by increasing the axial length of the chute on the speed regulating sleeve 15, so as to improve the precision of the block speed regulation.

Specific speed regulating operation process: In order to realize the soft start of the motor, the block 21 is turned to the leftmost end of the speed regulating sleeve 15 before the motor is started, so that the coupling area between the permanent magnet and the conductor ring is minimized. At this time, the air gap magnetic density is the smallest, and the transmitting torque of the coupler is also the smallest, so the load on the rotor of the motor is the smallest. After the motor is started, it is gradually moved to the right by toggling the block 21 to gradually increase the load on the motor to achieve soft start. At the same time, the torque of the driven shaft will be gradually increased, and finally reach a certain rotational speed requirement.

Example 2

Figure 11:
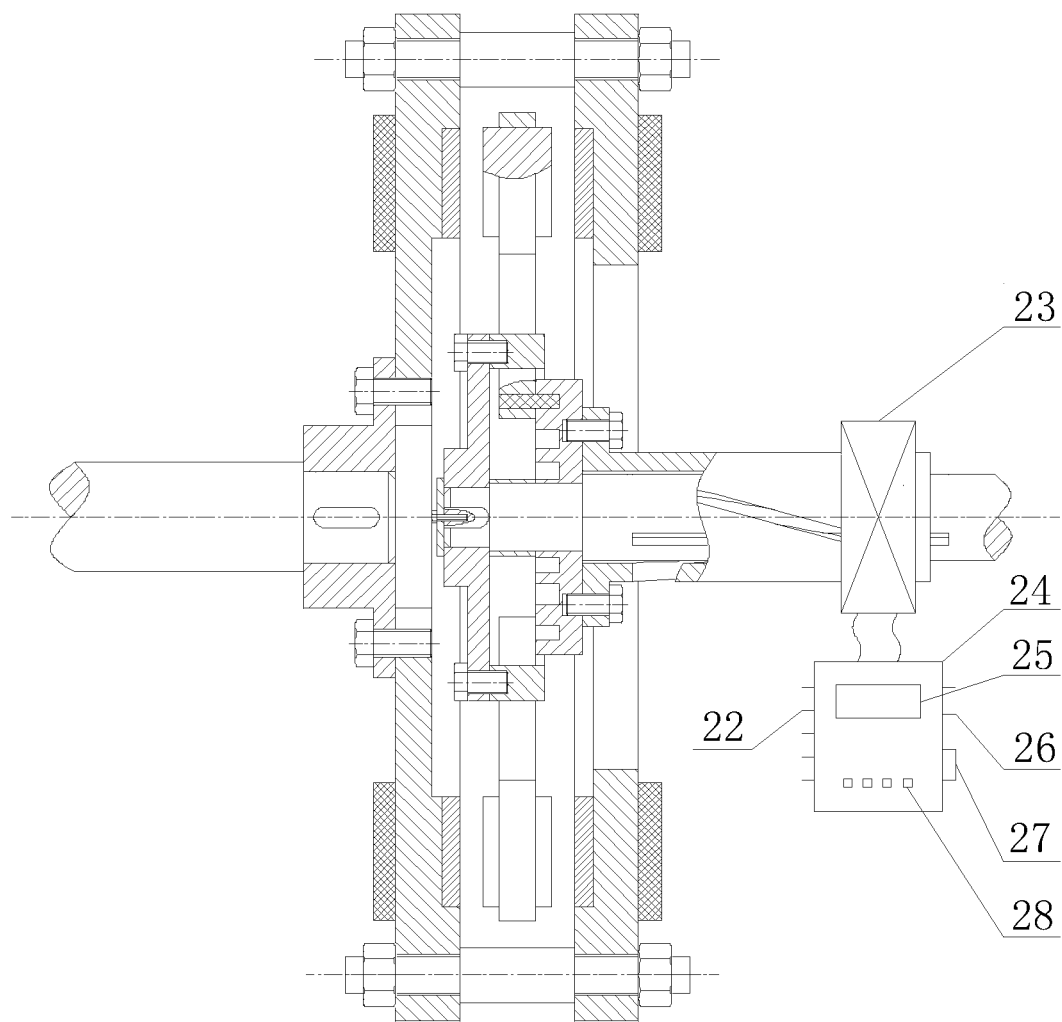
FIG. 11 is a cross-sectional view showing the structure of a disc type magnet radial movable adjustable speed magnetic coupler equipped with an intelligent controller of Example 2.
Figure 12:
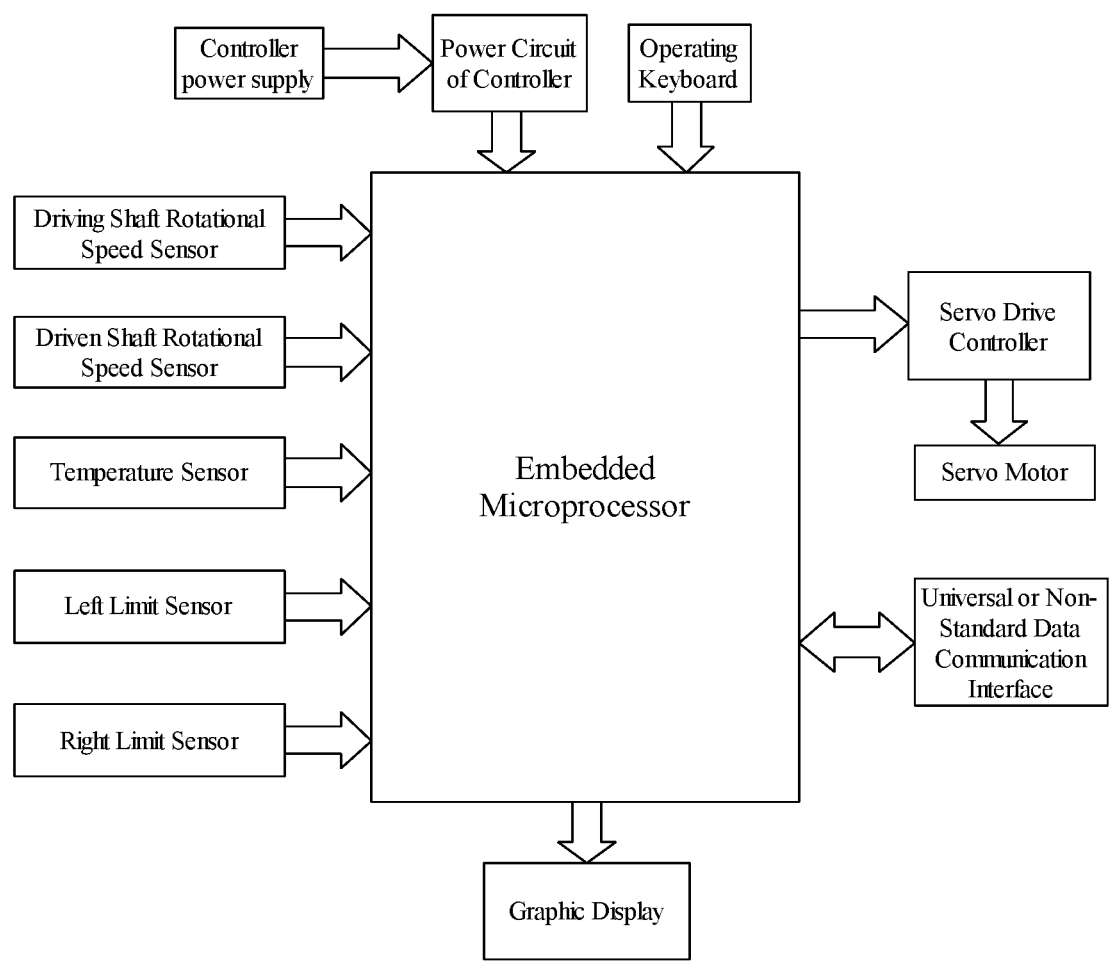
FIG. 12 is a block diagram showing the structural configuration and working principle of the intelligent controller of the Example 2.

As shown in FIG. 11, it is basically the same as example 1, except that a linear servo motor 23 is mounted on the block in this example, at the same time, rotational speed sensors are respectively mounted on the driving shaft and the driven shaft a limit sensor is installed at the corresponding positions of the left end and the right end of the speed regulating sleeve chute, and a temperature sensor is mounted on the heat sink, and an intelligent controller is additionally mounted. From the outside, the intelligent controller is composed of a controller casing 24, a graphic display unit 25, an operating keyboard unit 28, a sensor terminal 22, an output interface 26 and a communication interface 27, etc., As shown in FIG. 12, it is a block diagram showing the structural configuration and working principle of the intelligent controller, which is composed of an embedded microprocessor unit, a controller power supply and circuit unit, an operating keyboard unit, an graphic display unit, servo drive controller and servo motor unit, universal or non-standard data communication interface component, driving shaft rotational speed sensor and its interface unit, driven shaft rotational speed sensor and its interface unit, temperature sensor and its interface unit, left limit sensor and its interface unit and right limit sensor and its interface unit, etc. When the coupler is running, the intelligent controller power supply is connected to the embedded microprocessor through the circuit, and the measured data is transmitted by the rotational speed, temperature and limit sensors to the embedded microprocessor, and the servo motor is controlled by the program to make the corresponding action to control the axial position of the block and change the torque transmitted by the coupler to achieve the purpose of intelligent speed regulation. At the same time, the intelligent controller can be controlled by operating the keyboard, and the motion parameters of the intelligent controller are also displayed in the graphic monitor.

The working principle of this example: the first step is to design the direction of the chute on the speed regulating sleeve and the parameters of the linear servo motor. When the chute on the speed regulating sleeve is rotated to the right and the linear servo motor is rotated forward, the block is slid to the right. When the motor is rotated forward, the block is slid to the right, the coupling area between the permanent magnet and the conductor ring is increased, the torque transmission efficiency is increased, and the output shaft rotational speed is increased; on the contrary, when the servo motor is reversed, the block is slid to the left, the coupling area between the permanent magnet and the conductor ring is reduced, the torque transmission efficiency and the output shaft rotational speed are decreased. Similarly, when the chute on the speed regulating sleeve is rotated to the left and the linear servo motor is reversed, the block is slid to the right. At this time, the effect of regulating the rotational speed by the left and right sliding of the block through the motor is consistent with the above situation; and when the chute on the speed regulating sleeve is rotated to the right and the linear servo motor is reversed, the block is slid to the right or when the chute on the speed regulating sleeve is rotated to the left and the linear servo motor is reversed, the block is slid to the left. In both cases, when the block is slid to the right, the output shaft rotational speed is decreased, when the block is slid to the left, the output shaft rotational speed is increased.

Figure 13:
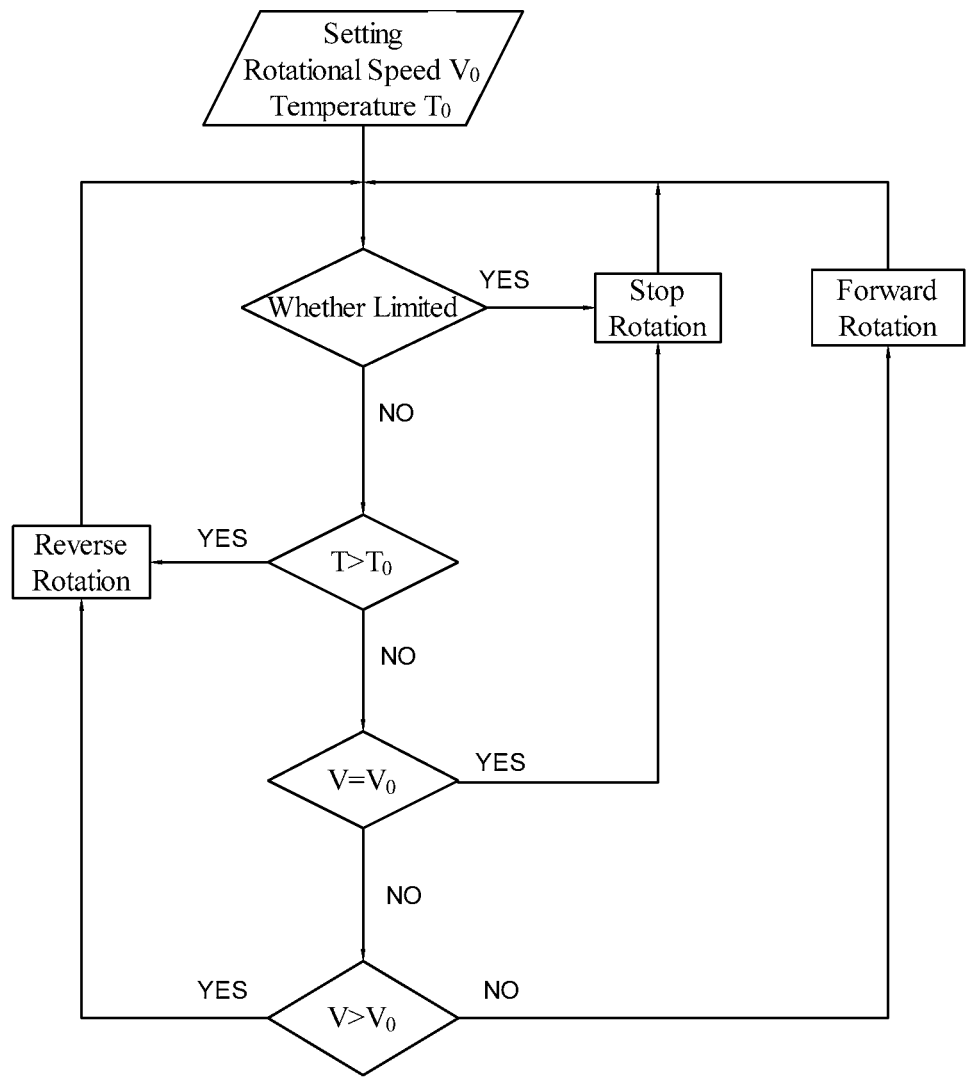
FIG. 13 is a flow chart showing the procedure of the intelligent controller of Example 2.

In the second step, only the case where the block slides to the right when the chute on the speed regulating sleeve rotates to the right and the linear servo motor rotates forward is illustrated. As shown in FIG. 13, a program flow chart of the intelligent controller is shown. First, on the intelligent controller, input the working rotational speed (that is, the rotational speed $V_0$ of the driven shaft) and the upper temperature limit $T_0$ of the heat sink by operating keyboard, the machine is started, and the coupler is run. First, determine whether the block is in the limit position. If yes, the servo motor stops rotating and re-determine whether it is in the limit position. If the block is not in the limit position, determine whether the heat sink temperature T reaches the upper temperature limit $T_0$. If yes, the motor is reversed, the torque transmission efficiency is reduced and the heat generation is reduced. If not, then determine whether the driven shaft rotational speed V is equal to the set rotational speed $V_0$. If yes, the motor stops rotating and keeps running at this speed. If not, determine whether the driven shaft rotational speed V is greater than the set rotational speed $V_0$. If yes, the motor is reversed, the output rotational speed is reduced. If not, the motor is rotated forward to increase the output rotational speed. Through the above feedback control, the set rotational speed is finally reached to achieve fully automatic intelligent control.

Example 3

Figure 14:
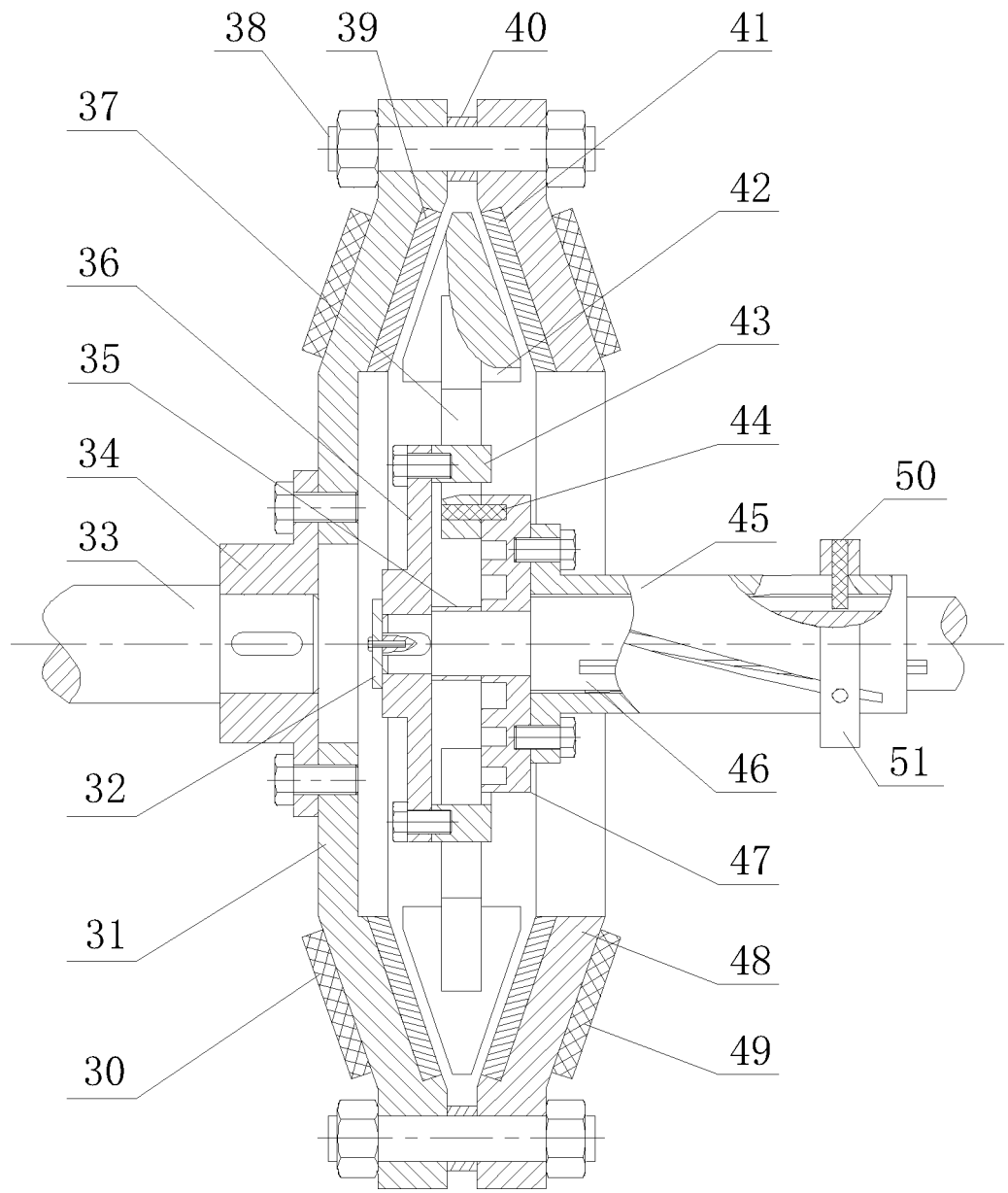
FIG. 14 is a cross-sectional view showing the structure of a wedge-shaped magnet radial movable adjustable speed magnetic coupler of Example 3.
Figure 16:
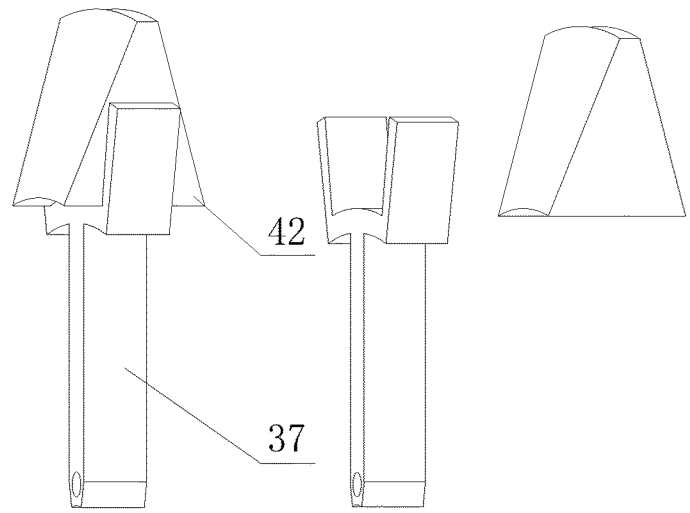
FIG. 16 is a schematic view showing the three-dimensional structure of the permanent magnet of Example 3.

As shown in FIG. 14, it is composed of a driving disc assembly, a driven disc assembly and a speed regulating device assembly. The driving disc assembly includes a driving shaft 46, a driving shaft sleeve 36, a baffle 32, a round frame 43, a permanent magnet carrier 37 and a permanent magnet 42. A driving shaft sleeve 36 is connected to the left end of the driving shaft 46 by a key, and a baffle 32 is connected to the left end surface of the driving shaft 46 by a screw to maintain axial fixing of the driving shaft sleeve 36. A round frame 43 is connected to the right side of the driving shaft sleeve 36 by a screw, and a rectangular through hole is formed in the round frame 43; a permanent magnet carrier 37 is inserted into the rectangular through hole of the round frame 43, The carrier frame at the upper end of the permanent magnet carrier 37 is a Y-shaped structure that cuts off the upper half, and a trapezoidal permanent magnet 42 is bonded to the Y-shaped carrier frame on the permanent magnet carrier 37, as shown in FIG. 16, and the permanent magnet 42 alternately arranged in N pole and S pole is bonded to the Y-shaped carrier frame of the permanent magnet carrier 37; the driven shaft assembly includes a driven shaft 33, a driven shaft sleeve 34, a driven disc left base 31, a bolt sleeve 40, a driven disc right base 48, a stud 38, a conductor ring 39, a conductor ring 41, a heat sink 30 and a heat sink 49. A driven shaft sleeve 34 is connected to the right end of the driven shaft 33 by a key; a driven disc left base 31 is connected to the right side of the driven shaft sleeve 34 by screws; the driven disc left base 31 and the driven disc right base 48 are fixedly connected through the stud 38, and a bolt sleeve is arranged on the stud to maintain the spacing between the driven disc bases, and the outer side of the driven disc base is provided with a tapered structure; a heat sink 30 and a heat sink 49 are respectively mounted on the outer end faces of the driven disc left base 31 and the driven disc right base 48 to increase the heat dissipation capability of the coupler; the speed regulating assembly includes a block 51, a block pin 50, a speed regulating sleeve 45, a grooved disc 47, a cylindrical pin 44 and a positioning sleeve 35, the speed regulating sleeve 45 is machined to with a chute, the driving shaft 46 is formed with a straight groove, and the speed regulating sleeve 45 is sleeved on the driving shaft 46; the block 51 can be slid to the left and right on the speed regulating sleeve 45, and a through hole is arranged on the block 51, and a block pin 50 is arranged on the through hole; the block pin 50 maintains contact and fitting with the chute on the speed regulating sleeve 45 and the straight groove on the driving shaft 46 simultaneously; the left side of the speed regulating sleeve 45 is connected to the grooved disc 47 by screws, and an arc groove with the same number as the permanent magnet is machined on the left end surface of the grooved disc 47; a through hole is formed at a lower end of the permanent magnet carrier 37, and the cylindrical pin 44 is passed through the through hole of the permanent magnet carrier 37 and maintains contact and fitting with the inner wall of the arc groove of the grooved disc 47; the positioning sleeve 35 is sleeved on the driving shaft 46, and the right side thereof is abutted against the grooved disc 47 to keep the grooved disc axial fixing.

Figure 15:
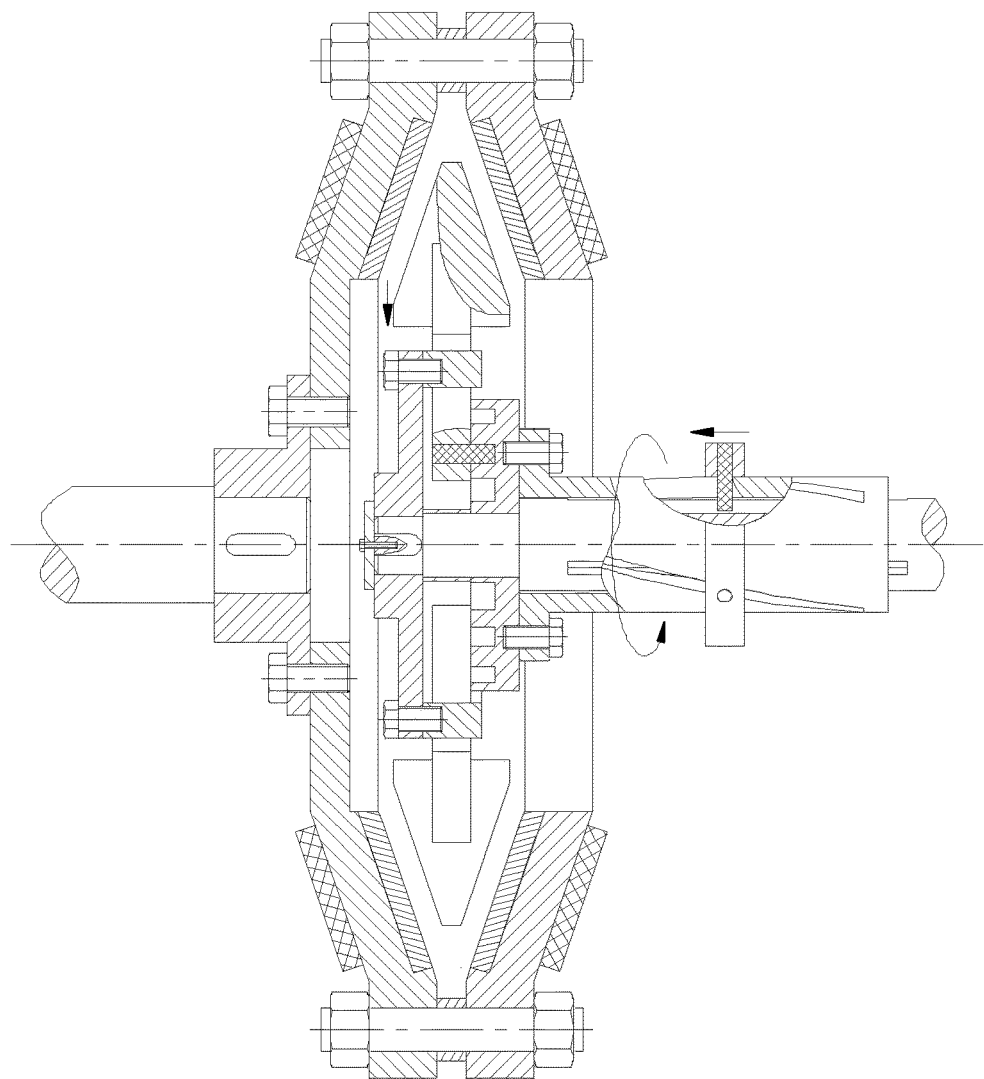
FIG. 15 is a cross-sectional view showing the structure of a wedge-shaped magnet radial movable adjustable speed magnetic coupler of Example 3 during speed regulation.

The working principle of this example is basically the same as that of example 1. The principle of the speed regulation is different from that of Example 1 in that: in this example, when the speed is adjusted, the coupling area between the permanent magnets and the air gap spacing between the permanent magnet and the conductor ring are changed at the same time, so as to change the size of the air gap magnetic density. When the coupling area between the permanent magnet and the conductor ring is the largest, and the air gap is the smallest, the electromagnetic torque transmitted by the coupler reaches the highest, when the coupling area between the permanent magnet and the conductor ring is reduced, and the air gap is the smallest, the electromagnetic torque between the driven disc and the driving disc is gradually decreased. In this example, the block 51 can be toggled to make an axial displacement, and the block pin 50 is inserted into the block 51 to axially slide the block pin 50 in the straight groove of the driving shaft 46. Due to the contact and fitting of the block pin 50 with the inner wall of the chute on the speed regulating sleeve 45, the speed regulating sleeve 45, together with the grooved disc 47, are rotated relative to the driving shaft 46. When the grooved disc 47 is relatively rotated with respect to the driving shaft 46, since the driving shaft 46 and the round frame 43 are fixedly connected by the driving shaft sleeve 36, the grooved disc 47 is also relatively rotated with respect to the round frame 43. The inner wall of the arc groove formed on the grooved disc 47 is contacted and fitted with the cylindrical pin 44, and the cylindrical pin 44 is connected to the permanent magnet carrier 37, such that the round frame 43, the permanent magnet carrier 37 together with the permanent magnet 42, the grooved disc 47 constitutes a grooved cam slider mechanism, and the relative rotation of the grooved disc 47 is used to realize the radial movement of the permanent magnet carrier 37, so as to change the coupling area and air gap spacing between the permanent magnet 42 and the conductor ring 39 and the conductor ring 41, as shown in FIG. 15, to change the air gap magnetic density in the air gap to achieve the purpose of speed regulation. It should be noted that, in this example, the permanent magnet may be replaced by two trapezoidal permanent magnets bonded with each other, as shown in example 1, and an intelligent controller device may be added on the block to realize automatic intelligent control. as shown in example 2.

Example 4

Figure 17:
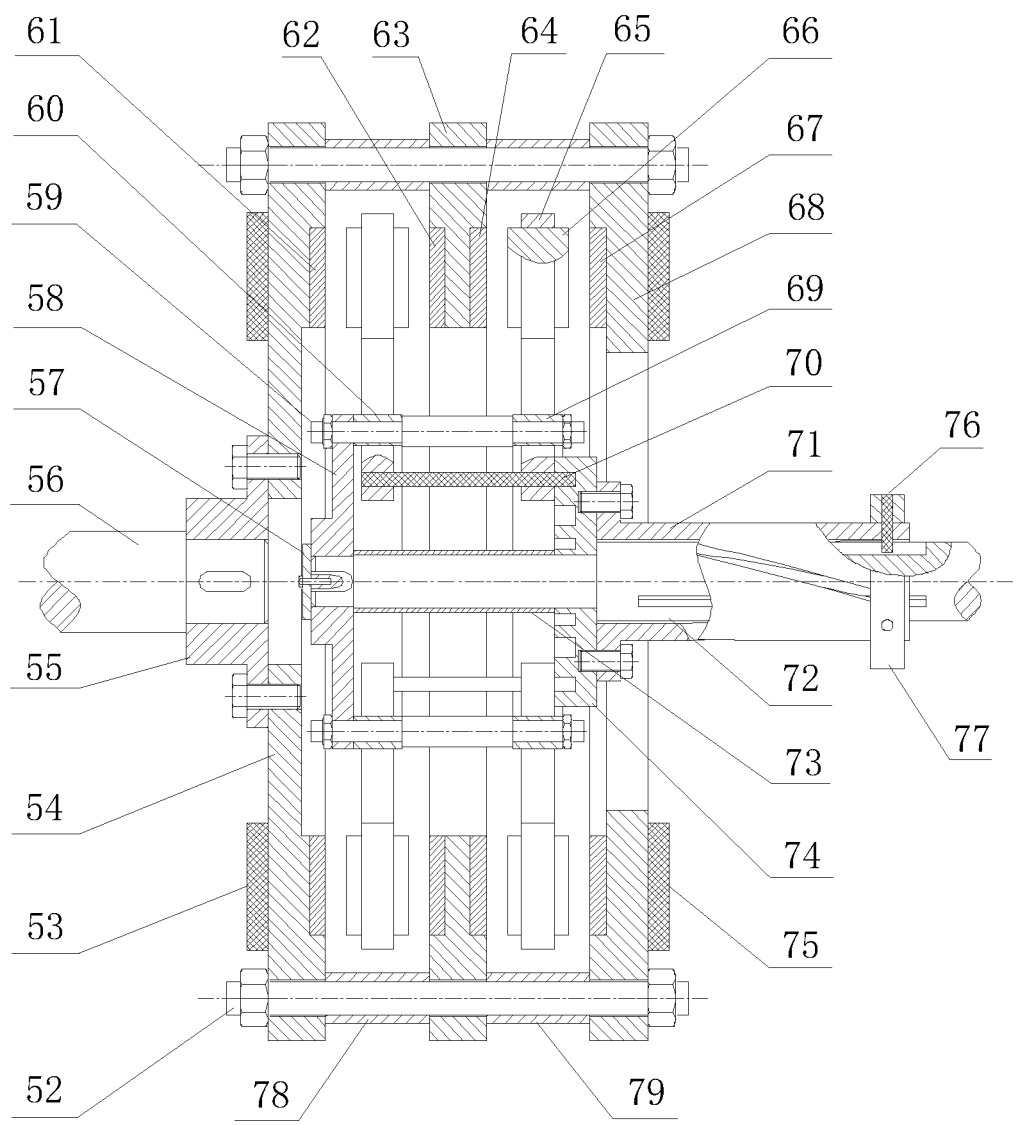
FIG. 17 is a cross-sectional view showing the structure of a multi-disc magnet radial movable adjustable speed magnetic coupler of Example 4.

As shown in FIG. 17, it is composed of a driving disc assembly, a driven disc assembly and a speed regulating device assembly. The driving disc assembly includes a driving shaft 72, a driving shaft sleeve 58, a baffle 57, a round frame 60, a round frame 69, a stud 59, a permanent magnet carrier 65 and a permanent magnet 66. A driving shaft sleeve 58 is connected to the left end of the driving shaft 72 by a key, and a baffle 57 is connected to the left end surface of the driving shaft 72 by screws to maintain the axial fixing of the driving shaft sleeve 58; a round frame 60 and a round frame 69 are connected to the right side of the driving shaft sleeve 58 through a stud 59, and rectangular through holes are respectively formed in the round frame 60 and the round frame 69; a permanent magnet carrier 65 is inserted into the rectangular through hole of the round frame 60 and the round frame 69, and a permanent magnet 66 is bonded to the carrier frame of the permanent magnet carrier 65, and the permanent magnet alternately arranged in N pole and S pole is bonded to the carrier frame of the permanent magnet carrier. The driven shaft assembly includes a driven shaft 56, a driven shaft sleeve 55, a driven disc left base 54, a driven disc intermediate base 63, a driven disc right base 68, a stud 52, a bolt sleeve 78, a bolt Sleeve 79, a conductor ring 61, a conductor ring 62, a conductor ring 64, a conductor ring 67, a heat sink 53 and a heat sink 75, a driven shaft sleeve 55 is connected to the right end of the driven shaft 56 by a key; a driven disc left base 54 is connected to the right side of the driven shaft sleeve 55 by a screw; the driven disc left base 54, the driven disc intermediate base 63, and the driven disc right base 68 are fixedly connected by a stud 52, and a bolt sleeve 78 and a bolt sleeve 79 are fitted over the bolts between adjacent bases to keep the driven disc base equidistant installation; a heat sink 53 and a heat sink 75 are respectively mounted on the outer end faces of the driven disc left base 54 and the driven disc right base 68 to increase the heat dissipation capability of the coupler. The speed regulating device assembly includes a block 77 and a block pin 76, a speed regulating sleeve 71, a grooved disc 74, a long cylindrical pin 70 and a positioning sleeve 73, the speed regulating sleeve 71 is processed with a chute, the driving shaft 72 is processed with a straight groove, and the speed regulating sleeve 71 is sleeved on the driving shaft 72; the block 77 can be slid to the left and right on the speed regulating sleeve 71, and a through hole is provided on the block 77, and a block pin 76 is mounted on the through hole; the block pin 76 is simultaneously contacted and fitted with the chute on the speed regulating sleeve 71 and the straight groove on the driving shaft 72; a grooved disc 74 is connected to the left side of the speed regulating sleeve 71 by screws, and an arc groove equal to the number of permanent magnets is processed on the left end surface of the grooved disc 74; a through hole is formed at a lower end of the permanent magnet carrier 65, and the long cylindrical pin 70 is passed through the through holes of the two permanent magnet carriers and is contacted and fitted with the inner wall of the arc groove of the grooved disc 74; the permanent magnets on the corresponding two permanent magnet carriers are alternately arranged in N pole and S pole in the axial direction; the positioning sleeve 73 is sleeved on the driving shaft 72, and the right side thereof is abutted against the grooved disc 74 to keep the grooved disc axial fixing.

The working principle and the speed regulation principle of this example are basically the same as those of the example 1. The difference between them is that this example adopts a double permanent magnet three driven discs structure, the round frame 60 is connected to the round frame 69 by using a stud 59, and the corresponding two permanent magnet carriers are connected by using the long cylindrical pin 70 to realize synchronous regulation of a pair of permanent magnets. It should be noted that, in this example, the permanent magnet may be replaced by two trapezoidal permanent magnets bonded with each other, as shown in example 1. In addition, an intelligent controller device can be added to the block to realize fully automatic intelligent control, as shown in example 2.

Example 5

Figure 18:
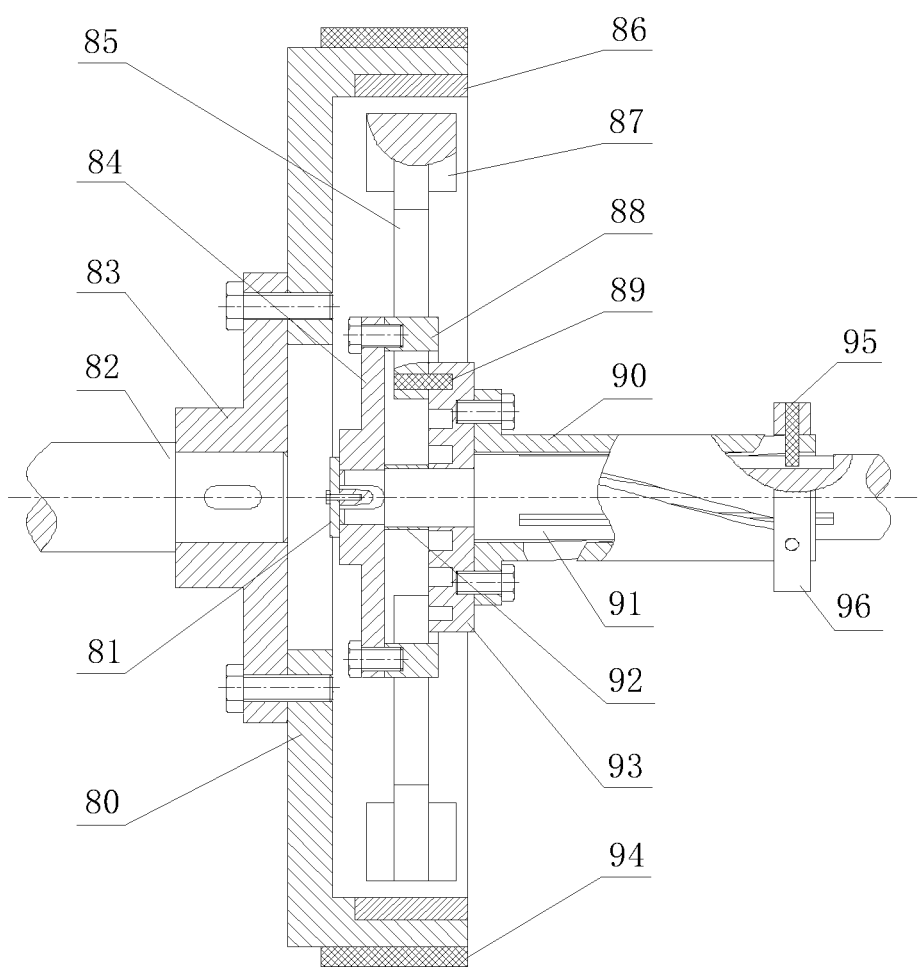
FIG. 18 is a cross-sectional view showing the structure of a cylindrical magnet radial movable adjustable speed magnetic coupler of Example 5.
Figure 20:
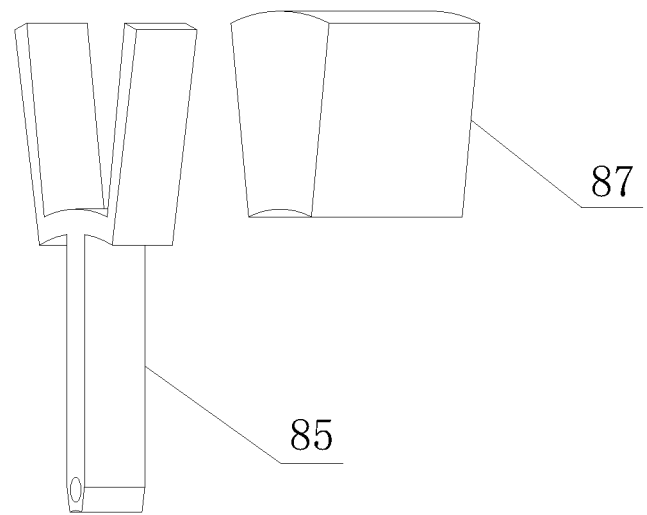
FIG. 20 is a schematic view showing the three-dimensional structure of the permanent magnet of Example 5.

As shown in FIG. 18, it is composed of a driving disc assembly, a driven disc assembly and a speed regulating device assembly. The driving disc assembly includes a driving shaft 91, a driving shaft sleeve 84, a baffle 81, a round frame 88, a permanent magnet carrier 85 and a permanent magnet 87, a driving shaft sleeve 84 is connected to the left end of the driving shaft 91 by a key, and a baffle 81 is connected to the left end surface of the driving shaft 91 by screws to maintain the axial fixing of the driving shaft sleeve 84; a round frame 88 is connected to the right side of the driving shaft sleeve 84 by screws, and a rectangular through hole is formed on the round frame 88; a permanent magnet carrier 85 is inserted into the rectangular through hole of the round frame 88. The carrier frame at the upper end of the permanent magnet carrier 85 is a Y-shaped structure that cuts off the upper half and a permanent magnet 87 is bonded to the Y-shaped carrier frame on the permanent magnet carrier 85, as shown in FIG. 20. The driven shaft assembly includes a driven shaft 82, a driven shaft sleeve 83, a driven disc base 80, a conductor ring 86, and a heat sink 94. A driven shaft sleeve 83 is connected to the right end of the driven shaft 82 by a key, a driven disc base 80 is connected to the right side of the driven shaft sleeve 83 by a screw; a conductor ring 86 is bonded to the inner side of the driven disc base 80, and a heat sink 94 is mounted on the outer side of the driven disc base 80. The speed regulating device assembly includes a block 96, a block pin 95, a speed regulating sleeve 90, a grooved disc 93, a cylindrical pin 89 and a positioning sleeve 92. The speed regulating sleeve 90 is processed with a chute, the driving shaft 91 is processed with a straight groove, and the speed regulating sleeve 90 is sleeved on the driving shaft 91; the block 96 can be slid to the left and right on the speed regulating sleeve 90, and a through hole is arranged on the block 96, and a block pin 95 is arranged on the through hole; the block pin 95 is simultaneously contacted and fitted with the chute on the speed regulating sleeve 90 and the straight groove on the driving shaft 91; a grooved disc 93 is connected to the left side of the speed regulating sleeve 90 by screws, and an arc groove with the same number as the permanent magnet is processed on the left end surface of the grooved disc 93; a through hole is formed at a lower end of the permanent magnet carrier 85, and the cylindrical pin 89 is passed through the through hole of the permanent magnet carrier 85 and is contacted and fitted with the inner wall of the arc groove of the grooved disc 93; the positioning sleeve 92 is sleeved on the driving shaft 91, and its right side is abutted against the grooved disc 93 to keep the grooved disc axial fixing.

Figure 19:
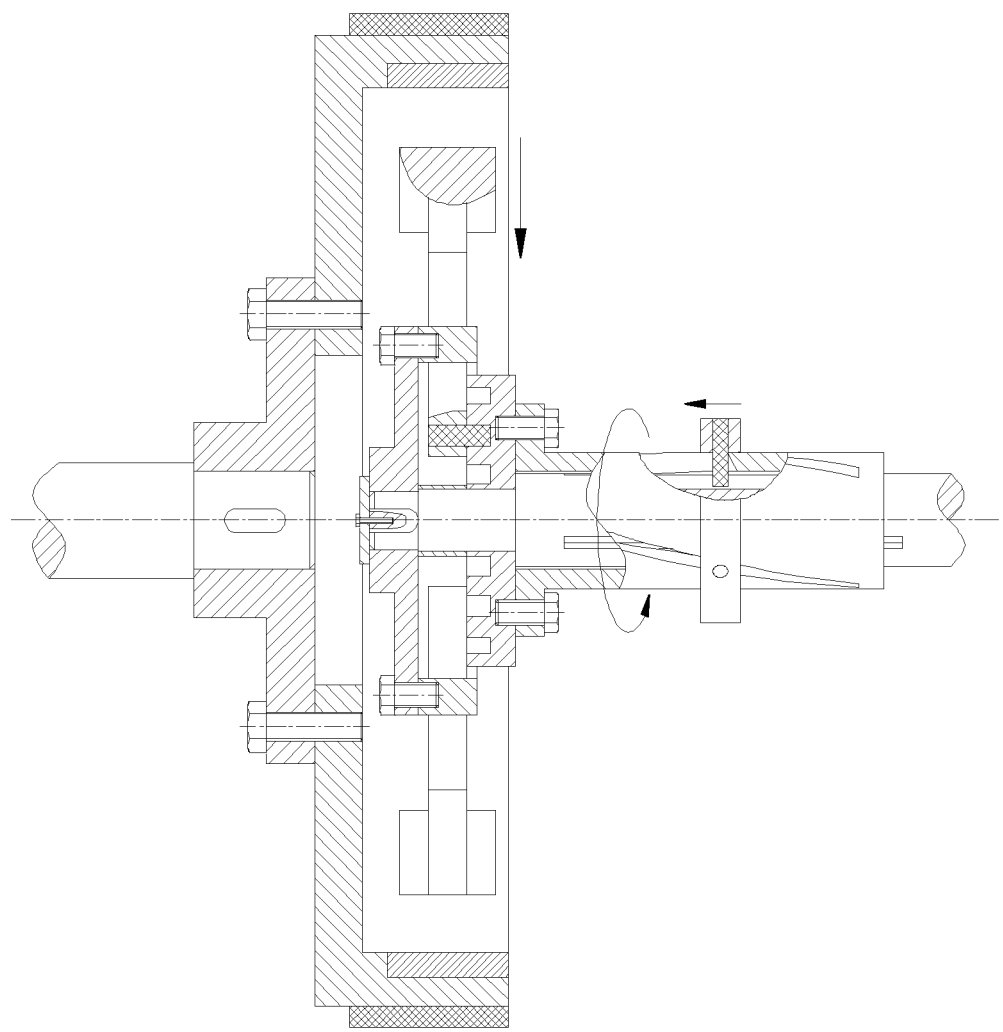
FIG. 19 is a cross-sectional view showing the structure of a cylindrical magnet radial movable adjustable speed magnetic coupler of Example 5 during speed regulation.

The working principle of this example is basically the same as that of example 1. The principle of the speed regulation is different from that of example 1 in that: in this Example, the coupling area between the permanent magnets is unchanged, and the air gap spacing between the permanent magnet and the conductor ring is changed, so as to change the size of the air gap magnetic density, when the air gap between the permanent magnet and the conductor ring is the smallest, the electromagnetic torque transmitted by the coupler reaches the highest, and when the air gap between the permanent magnet and the conductor ring is reduced, the electromagnetic torque between the driving disc and the driven disc will also be gradually decreased. In this example, a block 96 can be toggled to make an axial displacement, and a block pin 95 is inserted into the block 96 to axially slide the block pin 95 in the straight groove of the driving shaft 91. Due to the contact and fitting of the block pin 95 with the inner wall of the chute on the speed regulating sleeve 90, the speed regulating sleeve 90, together with the grooved disc 93, are rotated relative to the driving shaft 91. When the grooved disc 93 is rotated relative to the driving shaft 91, since the driving shaft 91 and the round frame 88 are fixedly connected by the driving shaft sleeve 84, the grooved disc 93 is also rotated relative to the round frame 88. The inner wall of the arc groove formed on the grooved disc 93 is contacted and fitted with the cylindrical pin 89, and the cylindrical pin 89 is connected to the permanent magnet carrier 85, such that the round frame 88 and the permanent magnet carrier 85 together with the permanent magnet 87 and the grooved disc 93 constitutes a grooved cam slider mechanism, and the relative rotation of the grooved disc 71 is used to achieve the radial movement of the permanent magnet carrier 85, so as to change the air gap spacing between the permanent magnet 87 and the conductor ring 86, as shown in FIG. 19, to change the air gap magnetic density in the air gap to achieve the purpose of speed regulation. It should be noted that, in this example, the permanent magnet may be replaced by two trapezoidal permanent magnets bonded with each other, as shown in example 1, and an intelligent controller device can also be added to the block to implement fully automatic intelligent control, as shown in example 2.

The invention claimed is:

1. A variable-speed magnetic coupler having a radially movable magnet, consisting of a driving disc assembly, a driven disc assembly and a speed regulating device assembly, the driven disc assembly includes a driven shaft, a conductor ring, a driven shaft sleeve, a driven disc base, a heat sink and a stud, a right end of the driven shaft is connected with the driven shaft sleeve through a key, a right side of the driven shaft sleeve is connected with the driven disc base by a screw, the conductor ring is bonded within the driven disc base by means of deep groove embedding, the driven disc base includes a plurality of driven disc bases, the driven disc bases are fixedly connected to each other by a plurality of studs, the heat sink is mounted on an outer side of one of the driven disc bases, the driving disc assembly includes a driving shaft, a driving shaft sleeve and permanent magnets, characterized in that, the driving disc assembly is further provided with a baffle, a round frame and a permanent magnetic carrier, a left end of the driving shaft is connected with the driving shaft sleeve through a key, a right side of the driving shaft sleeve is connected with the round frame through a screw, the permanent magnetic carrier with one of the permanent magnets bonded in an upper carrier frame is inserted into a rectangular through-hole of the round frame and is rotated synchronously with the driving shaft; the speed regulating device assembly includes a cylinder pin, a grooved disc, a speed regulating sleeve, a block, a block pin and a positioning sleeve, the grooved disc is sleeved on a left side of the driving shaft and an arc groove is machined on a left side of the grooved disc, one end of the cylinder pin is inserted into the through-hole at a lower end of the permanent magnetic carrier, and an other end of the cylinder pin is contacted and fitted with an inner wall of the arc groove of the grooved disc, which forms a groove cam slider mechanism together with the round frame, a right side of the grooved disc is connected with the speed regulating sleeve through a screw, the speed regulating sleeve is sleeved on the driving shaft, the speed regulating sleeve and the driving shaft are respectively processed by a same number of a chute and a straight groove, the block is sleeved in the speed regulating sleeve, the block pin includes a plurality of block pins, the block pins with a same number as the chute are inserted into a circular through hole of the block, and each of the block pins is simultaneously contacted and fitted with inner walls of one chute and one straight groove on the speed regulating sleeve and the driving shaft, a rotational angle of the straight groove on the speed regulating sleeve maintains a same with a circumferential angle of the arc groove on the grooved disc, the block can be slid axially on the speed regulating sleeve together with one of the block pins, and at a same time, a right end of the positioning sleeve is abutted against the grooved disc to keep its axial fixing.

2. The variable-speed magnetic coupler having a radially movable magnet as claimed in claim 1, characterized in that, the lower end of the permanent magnetic carrier is a cuboid with a same cross section everywhere, a cross-sectional size of the cuboid is equal to a cross-sectional size of the rectangular through-hole on the round frame; the permanent magnet bonded on the permanent magnetic carrier can adopt an integral permanent magnet or two step-shaped permanent magnets which can be respectively bonded together from both sides of the upper carrier frame of the permanent magnetic carrier so as to increase an arc coefficient of the permanent magnet.

3. The variable-speed magnetic coupler having a radially movable magnet as claimed in claim 1, characterized in that, when a rotational angle of the chute on the speed regulating sleeve is kept unchanged, under a condition that a working environment allows, an axial length of the chute on the speed regulating sleeve is increased as much as possible, so as to increase an axial travel of the block to achieve a purpose of increasing the speed regulation accuracy.

4. The variable-speed magnetic coupler having a radially movable magnet as claimed in claim 1, characterized in that, a linear servo motor is equipped on the block, and at a same time rotational speed sensors are respectively mounted on the driving shaft and the driven shaft, limit sensors are mounted at corresponding positions of left and right ends of the speed regulating sleeve chute, and temperature sensors are mounted on the heat sink, and each sensor is connected to an intelligent controller.

5. The variable-speed magnetic coupler having a radially movable magnet as claimed in claim 1, characterized in that, the driven disc base is a tapered disc, a conical conductor ring is bonded on an inner side of the tapered disc, and the upper carrier frame at an upper end of the permanent magnetic carrier is a Y-shaped structure and a permanent magnet with a trapezoid side is bonded on the Y-shaped upper carrier frame.

6. The variable-speed magnetic coupler having a radially movable magnet as claimed in claim 1, characterized in that, when the driven disc base of the magnetic coupler comprises a driven disc left base, a driven disc middle base and a driven disc right base, axially corresponding permanent magnets of the magnetic coupler are alternately arranged in N pole and S pole;

the driven disc bases are equidistantly mounted by the studs and a plurality of bolt sleeves; each of a plurality of long cylindrical pins passes through a through-hole at a lower end of two axially corresponding permanent magnetic carriers to realize synchronous movement.

7. The variable-speed magnetic coupler having a radially movable magnet as claimed in claim 1, characterized in that, when the magnetic coupler is adopted with a cylindrical structure, the driven disc base of the magnetic coupler adopts a cylindrical structure, while a cylindrical conductor ring is bonded, and the upper carrier frame on an upper end of the permanent magnetic carrier is a Y-shaped structure, in addition, a permanent magnet is bonded on the Y-shaped upper carrier frame.

8. The variable-speed magnetic coupler having a radially movable magnet as claimed in claim 1, characterized in that, speed regulation process is: the block is axially slipped by toggling the block and the block pin is inserted in the block, the block pin is slid to the left and right in the straight groove of the driving shaft, and at the same time the block pin is contacted and fitted with the inner wall of the chute on the speed regulating sleeve, so that the speed regulating sleeve along with the grooved disc generates a relative rotation relative to the driving shaft, and the driving shaft is fixedly connected with the round frame through the driving shaft sleeve, therefore the grooved disc relative to the round frame also generates relative rotation, and the inner wall of the arc groove machined on the left side of the grooved disc is contacted and fitted with the cylinder pin, the cylinder pin is also connected with the permanent magnetic carrier, in this way the round frame, the permanent magnetic carrier together with one of the permanent magnets and the grooved disc form a groove cam slider mechanism, by rotation of the grooved disc with respect to the round frame, and the connection of a surface of the arc groove of the grooved disc with the permanent magnetic carrier being contacted and fitted with the cylinder pin, the permanent magnetic carrier is slid radially in the rectangular through-hole of the round frame, finally, radial movement of the one of the permanent magnets is controlled by an axial slip of the block, so as to change a coupler area or air gap spacing between the one of the permanent magnets and the conductor ring to change an air gap magnetic density in an air gap to achieve a purpose of speed regulation.

9. The variable-speed magnetic coupler having a radially movable magnet as claimed in claim 4, characterized in that, when the magnetic coupler is equipped with an intelligent controller, data fed back by each sensor realizes automatic intelligent speed regulation of the magnetic coupler, at first to determine whether the block is in a limit position, if yes, the linear servo motor stops rotating and re-determines whether the block is in the limit position, if the block is not in the limit position, then determines whether a heat sink temperature T is up to an upper temperature limit $T_O$, if yes, then the linear servo motor is reversed to reduce a torque transmission efficiency and reduce the heat generation, if not, determine whether the driven shaft rotational speed V is equal to a set rotational speed $V_O$, if yes, the linear servo motor stops rotating and keeps running at this set rotational speed $V_O$, if not, determine whether the driven shaft rotational speed V is more than the set rotational speed $V_O$, if yes, the linear servo motor is reversed to reduce the driven shaft rotational speed V, if not, the linear servo motor is rotated forward to increase the driven shaft rotational speed V, finally the set rotational speed $V_O$ is reached through feedback control.

10. The variable-speed magnetic coupler having a radially movable magnet as claimed in claim 9, characterized in that, when the chute on the speed regulating sleeve is rotated to a right and the linear servo motor is rotated forward, the block is slid to the right, when the linear servo motor is rotated forward, the block is slid to the right, a coupler area between one of the permanent magnets and the conductor ring is increased, a torque transmission efficiency is increased, and the driven shaft rotational speed V is increased, on the contrary, when the linear servo motor is reversed, the block is slid to a left, the coupler area between one of the permanent magnets and the conductor ring is decreased, the torque transmission efficiency is decreased, and the driven shaft rotational speed V is decreased.

* * * * *